United States Patent
Lin et al.

(10) Patent No.: US 12,467,546 B2
(45) Date of Patent: Nov. 11, 2025

(54) MULTI-WAY VALVE

(71) Applicants: Zhejiang Geely Holding Group Co., LTD., Zhejiang (CN); ZHEJIANG LIANKONG TECHNOLOGIES CO., LTD, Zhejiang (CN)

(72) Inventors: Bingrong Lin, Zhejiang (CN); Junbo Xu, Zhejiang (CN); Guibin Li, Zhejiang (CN); Qiang Xue, Zhejiang (CN); Haijiang Dai, Zhejiang (CN)

(73) Assignees: Zhejiang Geely Holding Group Co., LTD., Zhejiang (CN); ZHEJIANG LIANKONG TECHNOLOGIES CO., LTD, Zhejiang (CN)

( * ) Notice: Subject to any disclaimer, the term of this patent is extended or adjusted under 35 U.S.C. 154(b) by 139 days.

(21) Appl. No.: 18/544,457

(22) Filed: Dec. 19, 2023

(65) Prior Publication Data

US 2024/0117883 A1    Apr. 11, 2024

Related U.S. Application Data

(63) Continuation of application No. PCT/CN2022/088078, filed on Apr. 21, 2022.

(30) Foreign Application Priority Data

Sep. 27, 2021   (CN) ............................ 202111137075.0

(51) Int. Cl.
*F16K 11/16*    (2006.01)
*F16K 31/04*    (2006.01)
(Continued)

(52) U.S. Cl.
CPC .......... *F16K 11/163* (2013.01); *F16K 31/041* (2013.01); *F16K 31/535* (2013.01); *F16K 11/02* (2013.01)

(58) Field of Classification Search
CPC ..... F16K 11/163; F16K 11/165; F16K 11/166
See application file for complete search history.

(56) References Cited

U.S. PATENT DOCUMENTS 8,584,708 B2 * 11/2013 Bartnick ............... F16K 11/165
137/870
12,078,255 B2 * 9/2024 Lillis ................. B01L 3/502738
(Continued)

FOREIGN PATENT DOCUMENTS

CN    206175674    5/2017
CN    107690543    2/2018
(Continued)

OTHER PUBLICATIONS

DE102018009680A9 machine translation (Year: 2020).*
(Continued)

*Primary Examiner* — Michael R Reid
(74) *Attorney, Agent, or Firm* — JCIPRNET

(57) ABSTRACT

A multi-way valve, related to the technical field of control valves, is used to solve the problem of large occupied space, complicated control, and high cost, because of the use of two driving devices for controlling a three-way proportional valve and a two-way proportional valve, where a driving device is connected to a first valve core in a transmission way, and the first valve core is provided with a first matching structure, and a second valve core is provided with a second matching structure that matches the first matching structure. In the first matching state, the first valve core rotates alone and the second valve core remains stationary; in the second matching state, the first valve core rotates to drive the second valve core to rotate synchronously.

11 Claims, 4 Drawing Sheets

(51) Int. Cl.
   *F16K 31/53*   (2006.01)
   *F16K 11/02*   (2006.01)

(56) References Cited

U.S. PATENT DOCUMENTS

| | | |
|---|---|---|
| 2006/0137752 A1 | 6/2006 | Rusconi |
| 2016/0178081 A1 | 6/2016 | Gramss et al. |
| 2021/0131575 A1 | 5/2021 | Bunda et al. |

FOREIGN PATENT DOCUMENTS

| | | |
|---|---|---|
| CN | 110529628 | 12/2019 |
| CN | 112128455 | 12/2020 |
| CN | 112709843 | 4/2021 |
| CN | 112780805 | 5/2021 |
| CN | 113251179 | 8/2021 |
| CN | 113294559 | 8/2021 |
| CN | 113333791 | 9/2021 |
| CN | 214222094 | 9/2021 |
| CN | 113864489 | 12/2021 |
| DE | 102018009680 | 6/2020 |
| JP | S525096 | 2/1977 |
| JP | H10196808 | 7/1998 |
| WO | 2019230749 | 12/2019 |

OTHER PUBLICATIONS

"Search Report of Europe Counterpart Application", issued on Aug. 21, 2024, p. 1-p. 9.
"Office Action of China Counterpart Application", with partial English translation thereof, issued on Sep. 26, 2024, p. 1-p. 7.
"International Search Report (Form PCT/ISA/210) of PCT/CN2022/088078", mailed on Jul. 25, 2022, with English translation thereof, pp. 1-7.
"Written Opinion of the International Searching Authority (Form PCT/ISA/237) of PCT/CN2022/088078", mailed on Jul. 25, 2022, with English translation thereof, pp. 1-7.
Office Action of China Counterpart Application, with Partial English translation, issued on Sep. 20, 2023, pp. 1-8.
"Notice of Reasons for Refusal of Japan Counterpart Application", issued on Nov. 27, 2024, with English translation thereof, p. 1-p. 8.

* cited by examiner

MULTI-WAY VALVE

CROSS-REFERENCE TO RELATED APPLICATION

This application is a continuation of International Application No. PCT/CN2022/088078, filed on Apr. 21, 2022, which claims priority to Chinese Patent Application No. 202111137075.0 filed on Sep. 27, 2021. The disclosures of the aforementioned applications are hereby incorporated by reference in their entireties.

BACKGROUND

Technical Field

The present application relate to the technical field of control valves and, in particular, to a multi-way valve.

Description of Related Art

In order to improve ranges of electric vehicles, it is necessary to achieve various modes such as heating a battery by a coolant electric heater, dissipating heat of a battery-drive system by a cooler, and heating a battery by waste heat of a driving system.

In existing coolant circuits of thermal management systems, the above multiple modes cannot be achieved by single proportional valves, but require combinations of various proportional valves such as three-way proportional valves, two-way proportional valves and other proportional valves to achieve.

In existing technologies, a three-way proportional valve and a two-way proportional valve need to be controlled by two driving devices, resulting in a large occupancy space, complex control, and high cost.

SUMMARY

In view of the above problems, embodiments of the present application provide a multi-way valve with simple control, compact structure and low cost.

In order to achieve the above objects, embodiments of the present application provide the following technical solutions. An embodiment of the present application provides a multi-way valve, including a valve seat, a first valve core, a second valve core, and a driving device; the driving device is connected to the first valve core in a transmission way; the first valve core is provided with a first matching structure, and the second valve core is provided with a second matching structure that matches the first matching structure. The first matching structure and the second matching structure have a first matching state and a second matching state. In the first matching state, the first valve core rotates alone, and the second valve core remains stationary; in the second matching state, the first valve core rotates to drive the second valve core to rotate synchronously. The valve seat is provided with a plurality of first valve ports corresponding to the first valve core, and the first valve core is provided with a first communication structure. The first communication structure is configured to make at least two first valve ports communicate with each other when the first valve core rotates to a first predetermined position. The valve seat is provided with a plurality of second valve ports corresponding to the second valve core, and the second valve core is provided with a second communication structure. The second communication structure is configured to make at least two second valve ports communicate with each other when the second valve core rotates to a second predetermined position.

Compared with existing technologies, the multi-way valve provided by the embodiment of the present application has the following advantages.

The driving device is connected to the first valve core in a transmission way. The first valve core is provided with a first matching structure, and the second valve core is provided with a second matching structure that matches the first matching structure. The first matching structure and the second matching structure have a first matching state and a second matching state. In the first matching state, the first valve core rotates alone and the second valve core remains stationary; in the second matching state, the first valve core rotates to drive the second valve core to rotate synchronously. In this way, the first valve core not only can rotate alone to change the relative angle between each first valve port and the first communication structure so as to adjust the flow rate of the first valve core; the first valve core but also can rotate to drive the second valve core to rotate together to change the relative angle between each second valve port and the second communication structure so as to adjust the flow rate of the second valve core, then the first valve core rotates to its original position without changing to the flow rate of the first valve core. Only one driving device is needed to drive and control the first valve core and the second valve core, resulting in simple control, compact structure, and low cost.

As an improvement of the multi-way valve of the embodiment of the application, the first matching structure includes a protrusion structure disposed on a first end surface of the first valve core, and the second matching structure includes a groove structure disposed on a second end surface of the second valve core. The first end surface is opposite to the second end surface, and at least a portion of the protrusion structure is located in the groove structure. An inner peripheral surface of the groove structure is provided with a first protrusion part, and the first protrusion part includes a first end surface and a second end surface which are arranged at intervals in the circumferential direction. In the first matching state, the protrusion structure is not in contact with the first end surface and the second end surface, and in the second matching state, the protrusion structure abuts against the first end surface or the second end surface.

As a further improvement of the multi-way valve of the embodiment of the application, the inner peripheral surface of the groove structure includes a first cylindrical surface, and the first protrusion part is disposed on the first cylindrical surface. The protrusion structure includes a first cylinder body and a second protrusion part protruding radially outward from the outer peripheral surface of the first cylinder body. The outer peripheral surface of the first cylinder body is located at the radial inside of the first protrusion part. Two end surfaces of the second protrusion part in the circumferential direction respectively form the first side surface and the second side surface. The outer peripheral surface of the second protrusion part includes a second cylindrical surface, and the second cylindrical surface is adapted to the first cylindrical surface.

As a further improvement of the multi-way valve of the embodiment of the application, the first protrusion part includes a third cylindrical surface disposed at a radial inside of the first protrusion part thereof, and the out peripheral surface of the first cylinder body includes a fourth cylindrical surface, and the third cylindrical surface is adapted to the fourth cylindrical surface.

As a further improvement on the multi-way valve of an embodiment of the present application, the protrusion structure includes a second cylinder body disposed on the first end surface of the first valve core and connected with the first cylinder body.

As a further improvement of the multi-way valve of the embodiment of the application, the second cylinder body is a circular cylinder, and the diameter of the second cylinder body is the same as that of the second cylindrical surface.

As a further improvement of the multi-way valve of the embodiment of the present application, the first communication structure includes a first groove disposed on the outer peripheral surface of the first valve core and extending in the circumferential direction thereof. The second communication structure includes a second groove disposed on the outer peripheral surface of the second valve core and extending in the circumferential direction thereof.

As a further improvement of the multi-way valve of the embodiment of the application, the valve seat is provided with three first valve ports, and in the circumferential direction of the valve seat, the angle formed by each of the three first valve port is less than or equal to the angle formed by the first groove; and/or, the valve seat is provided with two second valve ports, and in the circumferential direction of the valve seat, the angle formed by each of the two second valve port is less than or equal to the angle formed by the second groove.

As a further improvement of the multi-way valve of the embodiment of the application, each first valve port is in communication with the first valve core through a first channel. Each second valve port is in communication with the second valve core through a second channel. The first valve port and the second valve port are arranged at the same side of the valve seat.

As a further improvement of the multi-way valve of the embodiment of the present application, the driving device includes a motor and a gear set connected to the motor in a transmission way, and the gear set is connected to the first valve core in a transmission way.

BRIEF DESCRIPTION OF DRAWINGS

To describe the technical solutions in embodiments of the present application or in the prior art more clearly, the following briefly introduces the accompanying drawings needed for describing the embodiments or the prior art. Apparently, the accompanying drawings in the following description illustrate merely some embodiments of the present application, and persons of ordinary skill in the art may still derive other drawings from these accompanying drawings without creative effort.

DESCRIPTION OF EMBODIMENTS

In order to improve ranges of electric vehicles, it is necessary to achieve various modes such as heating a battery by a coolant electric heater, dissipating heat of a battery-drive system by a cooler, and heating a battery by waste heat of a driving system. In existing coolant circuits of thermal management systems, the above multiple modes cannot be achieved by single proportional valves, but require combinations of various proportional valves such as three-way proportional valves, two-way proportional valves and other proportional valves to achieve. In existing technologies, a three-way proportional valve and a two-way proportional valve need to be controlled by two driving devices, resulting in a large occupancy space, complex control, and high cost.

For the above problem, the present application provides a multi-way valve, in which a driving device is connected to a first valve core in a transmission way. The first valve core is provided with a first matching structure, and a second valve core is provided with a second matching structure matching with the first matching structure. According to the design of the first matching structure and the second matching structure, when the first valve core is rotated alone, the relative angle between each first valve port and a first communication structure is changed so as to adjust the flow rate of each first valve core. When the first valve core rotates to drive the second valve core to rotate, the relative angle between each second valve port and a second communication structure is changed so as to adjust the flow rate of each second valve port, and after the adjustment is completed, the first valve core is rotated to its original position again without change to the flow rate of the first valve port. In this way, only one driving device is needed to drive and control the first valve core and the second valve core, resulting in simple control, compact structure, and low cost.

To make the objectives, technical solutions, and advantages of embodiments of the present application clearer, the following clearly and comprehensively describes the technical solutions in embodiments of the present application with reference to the accompanying drawings in embodiments of the present application. Apparently, the described embodiments are merely a part rather than all embodiments of the present application. All other embodiments obtained by persons of ordinary skill in the art based on embodiments of the present application without creative effort shall fall within the protection scope of the present application.

A multi-way valve according to an embodiment of the present application is described below with reference to the accompanying drawings.

Figure 1:
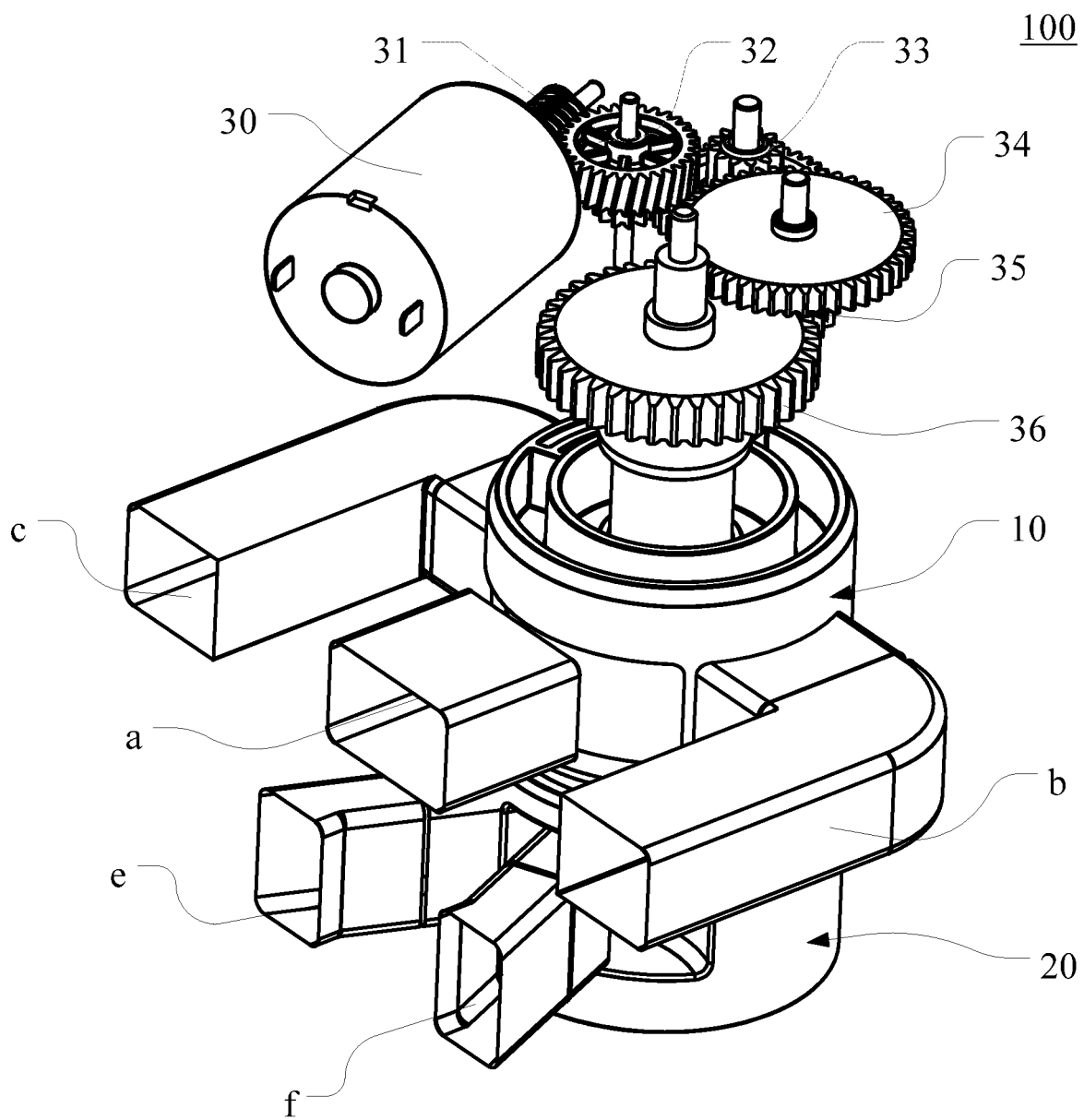
FIG. 1 is a schematic structural diagram of a multi-way valve provided by an embodiment of the present application.

Referring to FIG. 1, FIG. 1 is a schematic structural diagram of a multi-way valve provided by an embodiment of the present application. A multi-way valve 100 includes a valve seat, a first valve core 10, a second valve core 20, and a driving device. The driving device is connected to the first valve core 10 in a transmission way. The first valve core 10 is provided with a first matching structure, and the second valve core 20 is provided with a second matching structure that matches with the first matching structure. The first matching structure and the second matching structure have a first matching state and a second matching state. In the first matching state, the first valve core 10 rotates alone and the second valve core 20 remains stationary. In the second matching state, the first valve core 10 rotates to drive the second valve core 20 to rotate synchronously.

The valve seat is provided with a plurality of first valve ports corresponding to the first valve core 10, and the first valve core 10 is provided with a first communication structure. The first communication structure is configured to make at least two first valve ports communicate with each other when the first valve core 10 rotates to a first predetermined position. The valve seat is provided with a plurality of second valve ports corresponding to the second valve core 20, and the second valve core 20 is provided with a second communication structure. The second communication structure is configured to make at least two second valve ports communicate with each other when the second valve core 20 rotates to a second predetermined position.

The driving device is connected to the first valve core 10 in a transmission way. When the first valve core 10 rotates, the first matching structure on the first valve core 10 can drive the second valve core 20 to rotate through the second matching structure. In this way, the first valve core 10 not only can rotate alone to change the relative angle between each first valve port and the first communication structure so as to adjust the flow rate of the first valve core 10; the first valve core 10 but also can rotate to drive the second valve core 20 to rotate together to change the relative angle between each second valve port and the second communication structure so as to adjust the flow rate of the second valve core 20, then the first valve core 10 rotates to its original position without changing to the flow rate of the first valve core 10. Only one driving device is needed to drive and control the first valve core 10 and the second valve core 20, resulting in simple control, compact structure, and low cost.

Figure 2:
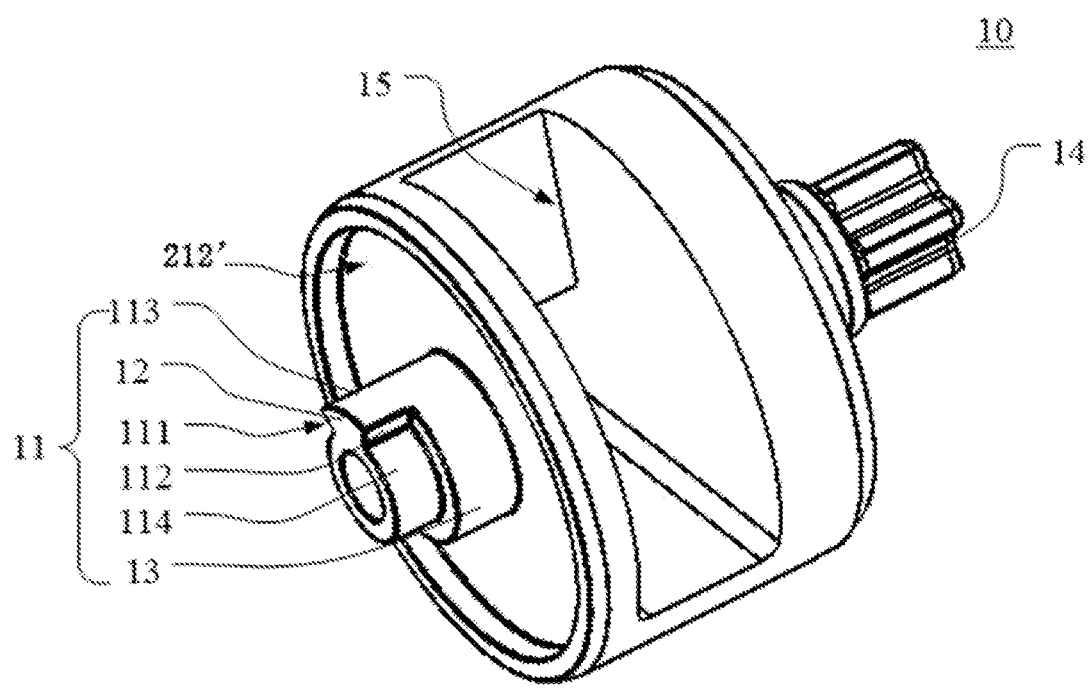
FIG. 2 is a schematic structural diagram of a first valve core provided by an embodiment of the present application.
Figure 3:
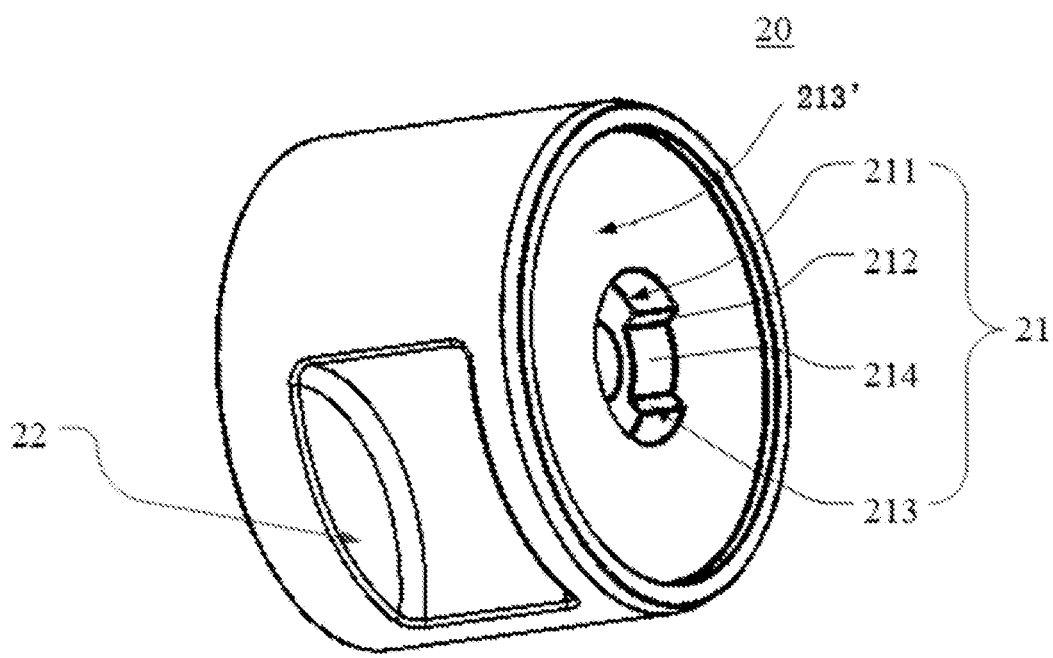
FIG. 3 is a schematic structural diagram of a second valve core provided by an embodiment of the present application.

The first matching structure and the second matching structure can be configured as any structure that meets the above requirements. In an optional embodiment, referring to FIG. 2 and FIG. 3, FIG. 2 is a schematic structural diagram of a first valve core provided by an embodiment of the present application, and FIG. 3 is a schematic structural diagram of a second valve core provided by an embodiment of the present application. The first matching structure includes a protrusion structure 11 disposed on a first end surface 212' of the first valve core 10, and the second matching structure includes a groove structure 21 disposed on a second end surface 213' of the second valve core 20. The first end surface 212' of the valve core 10 is opposite to the second end surface 213' of the second valve core 20, and at least a portion of the protrusion structure 11 is located in the groove structure 21.

In an optional embodiment, an inner peripheral surface of the groove structure 21 is provided with a first protrusion part, and the first protrusion part includes a first end surface 212 and a second end surface 213 that are spaced apart in the circumferential direction of the inner peripheral surface of the groove structure 21. In the first matching state, the protrusion structure 11 is not in contact with the first end surface 212 and the second end surface 213, so that the first valve core 10 can rotate alone in the groove structure. In the second matching state, the protrusion structure 11 abuts against the first end surface 212 or the second end surface 213, so that the first valve core 10 can drive the second valve core 20 to rotate synchronously. The setting of the first end surface 212 and the second end surface 213 can better achieve the first matching state and the second matching state.

An outer peripheral surface of the protrusion structure 11 includes a first side surface 111 and a second side surface 112 that are spaced apart in the circumferential direction. An inner peripheral surface of the groove structure 21 is provided with a first protrusion part, and the first protrusion part includes a first end surface 212 and a second end surface 213 that are spaced apart in the circumferential direction. When the protrusion structure 11 rotates in a first direction until the first side surface 111 abuts against the first end surface 212, the protrusion structure 11 can drive the second valve core 20 to rotate synchronously with the first valve core 10 in the first direction. When the protrusion structure 11 rotates in a second direction until the second side surface 112 abuts against the second end surface 213, the protrusion structure 11 can drive the second valve core 20 to rotate synchronously with the first valve core 10 in the second direction. When the first valve core 10 drives the second valve core 20 to rotate together, the protrusion structure 11 and the groove structure 21 can better cooperate.

In a possible implementation, the inner peripheral surface of the groove structure 21 includes a first cylindrical surface 211, and the first protrusion part is disposed on the first cylindrical surface 211. The protrusion structure 11 includes a first cylinder body 12 and a second protrusion part protruding radially outward from an outer peripheral surface of the first cylinder body 12. The outer peripheral surface of the first cylinder body 12 is located at a radial inside of the first protrusion part. Two end surfaces of the second protrusion part in the circumferential direction thereof respectively form a first side surface 111 and a second side surface 112. An out peripheral surface of the second protrusion part includes a second cylindrical surface 113, and the second cylindrical surface 113 is adapted to the first cylindrical surface 211. Since the protrusion structure 11 is provided with the second protrusion part, the axial force, produced when the first valve core 10 rotates, can be better transmitted to the second valve core 20, this is convenient for the application of force.

Further in a possible implementation, the first protrusion part includes a third cylindrical surface 214 disposed at a radial inside of the first protrusion part thereof, and the out peripheral surface of the first cylinder body 12 includes a fourth cylindrical surface 114, and the third cylindrical surface 214 is adapted to the fourth cylindrical surface 114. With this design, when the first valve core 10 drives the second valve core 20 to rotate together, the rotation stability is ensured.

In an optional embodiment, the protrusion structure 11 includes a second cylinder body 13 disposed on the first end surface 212 of the first valve core 10 and connected to the first cylinder body 12. The second cylinder body 13 make the first valve core 10 and the second valve core 20 keep a certain distance therebetween, thereby reducing contact area. When the first valve core 10 rotates, the friction resistance is reduced and the transmission efficiency is improved.

In a possible implementation, in order to further improve the transmission efficiency, a first round hole is disposed in the center of the protrusion structure 11 of the first valve core 10, and a second round hole is disposed in the center of the groove structure 21 of the second valve core 20, and a transmission shaft connects the first round hole and the second round hole, so that when the first valve core 10 drives the second valve core 20 to rotate together, the friction resistance is reduced and the transmission efficiency is improved.

The shape of the second cylinder body 13 may be a square cylinder or a circular cylinder. For the convenience of processing, it is preferable that the second cylinder body 13 is a circular cylinder. The diameter of the second cylinder body 13 is the same as the diameter of the second cylindrical surface 113, so that the bottom surface of the second cylinder body 13 can be relatively prevented from contacting the second valve core 20, thereby reducing the frictional resistance.

It should be noted that the first direction is the direction in which the first side surface 111 of the first valve core 10 rotates toward the first end surface 212 of the second valve core 20; the second direction is the direction in which the second side surface 112 of the first valve core 10 rotates toward the second end surface 213 of the second valve core 20.

When the first valve core 10 drives the second valve core 20 to rotate synchronously, there are two situations. In the first situation, when the protrusion structure 11 of the first valve core 10 rotates in the first direction until the first side surface 111 abuts against the first end surface 212, it can drive the second valve core 20 to rotate synchronously with the first valve core 10 in the first direction. In the second situation, when the protrusion structure 11 of the first valve core rotates in the second direction until the second side surface 112 abuts against the second end surface 213, it can drive the second valve core 20 to rotate synchronously with the first valve core in the second direction.

When the first valve core 10 rotates alone, there are two situations. In the first situation, when the protrusion structure 11 of the first valve core 10, starting from a state in which the first side surface 111 contacts the first end surface 212, rotates in the second direction until the second side surface 112 contacts the second end surface 213, the first valve core 10 rotates alone, and the second valve core 20 remains stationary. In the second situation, the protrusion structure of the first valve core 10, starting from a state in which the second side surface 112 contacts the second end surface 213, rotates in the first direction until the first side surface 111 contacts the first end surface 212, the first valve core 10 rotates alone, and the second valve core 20 remains stationary.

In order to achieve the communication of pipeline channels, the valve seat is provided with a plurality of first valve ports corresponding to the first valve core 10, and the first valve core 10 is provided with a first communication structure, and the first communication structure is used to make at least two first valve ports communicate with each other when the first valve core 10 rotates to a first predetermined position. The valve seat is provided with a plurality of second valve ports corresponding to the second valve core 20, and the second valve core 20 is provided with a second communication structure, and the second communication structure is used to make at least two second valve ports communicate with each other when the second valve core 20 rotates to a second predetermined position. The provision of the first communication structure and the second communication structure on the first valve core 10 and the second valve core 20 respectively achieves the communication between a plurality of first valve ports and the communication between a plurality of second valve ports, respectively. The provision of the first communication structure and the second communication structure makes the structure of the multi-way valve 100 more compact and space reduced.

The first communication structure and the second communication structure can be configured as any structure that can meet the requirements. For convenience of processing, in an optional embodiment, the first communication structure includes a first groove 15 disposed on the outer peripheral surface of the first valve core 10 and extending in the circumferential direction thereof; the second communication structure includes a second groove 22 disposed on the outer peripheral surface of the second valve core 20 and extending in the circumferential direction thereof.

The valve seat is provided with a plurality of first valve ports corresponding to the first valve core 10. In a specific embodiment, a valve seat is provided with three first valve ports, and in the circumferential direction of the valve seat, the angle formed by each of the three first valve port is less than or equal to the angle formed by the first groove 15, so that the three first valve ports can achieve communicating with each other and being blocked.

The valve seat is provided with a plurality of second valve ports corresponding to the second valve core 20. The valve seat can provided with two second valve ports, and in the circumferential direction of the valve seat, the angle formed by each of the two second valve port is less than or equal to the angle formed by the second groove 22, so that the two second valve ports can achieve communicating with each other and being blocked.

In an optional embodiment, each first valve port is in communication with the first valve core 10 through a first channel, and each second valve port is in communication with the second valve core 20 through a second channel, and each first valve port and each second valve port are arranged at a same side of the valve seat. The central arrangement of each first valve ports and each second valve port on the same side of the valve seat facilitates pipeline layout and reduces space.

In an optional implementation, the first channels are channel a, channel b and channel c respectively, channel a is an inlet channel, channel b and channel c are outlet channels, and channel b is located between channel a and channel c. The angle between the first channels is not limited. In order to avoid the interference of the three first channels, the angle between the three first channels is 90 degrees. The second channels are respectively channel e and channel f, and the angle between the two second channels is 90 degrees.

Figure 4:
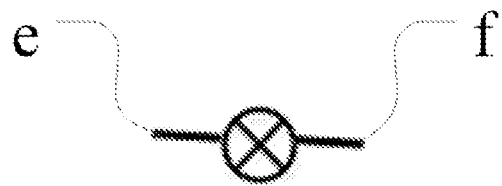
FIG. 4 is a schematic diagram of a flow path of a second valve core provided by an embodiment of the present application.
Figure 5:
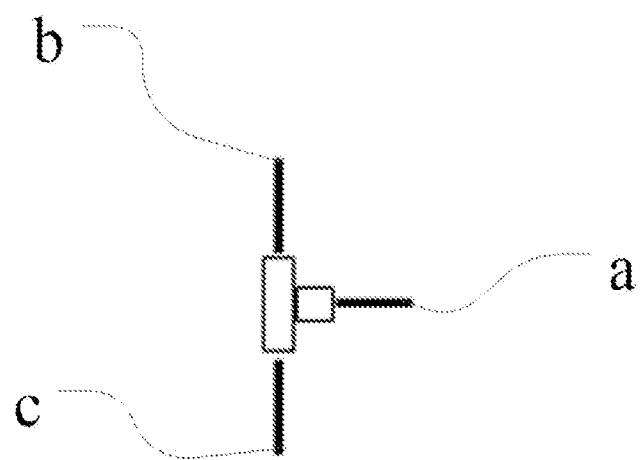
FIG. 5 is a schematic diagram of a flow path of a first valve core provided by an embodiment of the present application.

Referring to FIG. 4 and FIG. 5, FIG. 4 is a schematic diagram of a flow path of a second valve core provided by an embodiment of the present application; FIG. 5 is a schematic diagram of a flow path of a first valve core provided by an embodiment of the present application. The first valve core 10 and the valve seat, matching with each other, are equivalent to a three-way proportional valve. The second valve core 20 and the valve seat, matching with each other, are equivalent to a two-way proportional valve. As shown in FIG. 4 and FIG. 5, the function to be achieved by the first valve core 10 is that channel a is for going in and channel b is for going out; or channel a is for going in and channel c is for going out. The function to be achieved by the second valve core 20 is that channel e is for going in and channel f is for going out. The multi-way valve 100 achieves the functions of a three-way proportional valve and a two-way proportional valve, and achieves the purpose of five channels through a drive device, resulting in high integration and compact arrangement.

In a possible implementation, channel a, channel b and channel c of the first valve core and channel e and channel f of the second valve core 20 are centrally arranged on a mounting surface of the valve seat, leading to beautiful layout and reduced space.

The angle formed by each of the three first valve port is less than or equal to the angle formed by the first groove 15, and the angle formed by each of the two second valve port is less than or equal to the angle formed by the second groove 22. In a possible implementation, the first groove 15 forms an angle of 180 degrees, and the second groove 22 forms an angle of 180 degrees.

In an initial state, the first side surface 111 of the first valve core 10 abuts against the first end surface 212 of the second valve core 20, channel a and channel c are located at the first groove 15, and channel b is located at the outer peripheral surface of the first valve core 10. The first valve core 10 blocks channel b, and channel a is in communication with the channel c. Channel e is located at the outer peripheral surface of the second valve core 20, and the second valve core 20 blocks the channel e, and channel f is located at the second groove 22, therefore, channel e and channel f are in a closed state.

In a second state, based on the initial state, when the first valve core 10 rotates 45 degrees in the second direction, the second valve core 20 does not move, channels a and b are located at the first groove 15, and channel c is located at the outer peripheral surface of the first valve core 10. The first valve core 10 blocks channel c, and channel a is in communication with the channel b. Channel e and channel f of the second valve core 20 remains stationary, and channel e and channel f are still in the closed state.

In a third state, based on the second state, when the first valve core 10 drives the second valve core 20 to rotate 45 degrees in the first direction synchronously with the first valve core 10, channels e and f of the second valve core 20 are located at the second groove 22, and channel e is in communication with channel f Channel c and half of the channel a of the first valve core 10 are located at the first groove 15, and the opening degree of channel a is 50%. Channel b is located at the outer peripheral surface of the first valve core 10, and the first valve core 10 blocks channel b.

In a fourth state, on the basis of the third state, when the first valve core 10 rotates 45 degrees in the second direction, it returns to the initial state, and the second valve core 20 does not move. Channel a and channel c of the first valve core 10 are located at the first groove 15, and channel b is located at the outer peripheral surface of the first valve core 10. The first valve core blocks channel b, and channel a is in communication with the channel c. The channel e and the channel f of the second valve core 20 remain unchanged, and the channel e is in communication with the channel f.

It should be noted that the rotation of the first valve core 10 can be adjusted to adjust the opening degree of channel a, channel b and channel c from 0 to 100%. The first valve core 10 drives the second valve core 20 to rotate together, so as to adjust the opening degree of channel e and channel f from 0 to 100%. For example, by adjusting the area of channel a relative to the area of the first groove 15, the opening degree of channel a is changed. When the whole channel a corresponds to the first groove 15, the opening degree of channel a is 100%; when half of channel a corresponds to the first groove 15, the opening degree of channel a is 50%; when the whole channel a is blocked by the first valve core 10, the opening degree of channel a is 0.

In a possible implementation, the first valve core 10 and the second valve core 20 are formed by an injection molding process, which has fast production speed and high efficiency, and can easily form parts with complex shapes.

The driving device can be configured as any structure capable of driving the first valve core 10 to rotate. In an optional embodiment, a driving device includes a motor 30 and a gear set connected to the motor 30 in a transmission way, and the gear set is connected to the first valve core 10 in a transmission way. A worm 31 is set on a shaft of the motor 30, and the gear set includes a first turbine 32 that cooperates with the worm 31, a second turbine 33 that meshes with the first turbine 32, a third turbine 34 that meshes with the second turbine 33, a first gear 35 connected to the bottom of the third turbine 34, and a second gear 36 that meshes with the first gear 35. The central axes of the first turbine 32, the second turbine 33, the third turbine 34, the first gear 35, and the second gear 36 in the gear set are parallel to each other and placed along the vertical direction, and the central axis of the first worm 31 is perpendicular to the central axis of the first turbine 32. The worm 31 on the shaft of the motor 30 rotates to drive the first valve core 10 to rotate together through the transmission of the gear set, thereby ensuring the stability of the transmission.

The type of the motor 30 is not limited. In order to simplify the control and ensure accuracy, in a possible implementation, the motor 30 is a stepper motor 30 or a servo motor 30.

In order to achieve the connection between the first valve core 10 and the second gear 36, in a possible implementation, the first valve core 10 is provided with a first connection part and the second gear 36 is provided with a second connection part, and the first connection part can form a detachable connection with the second connection part.

Further in a possible implementation, the first connection part includes a spline shaft 14 disposed on the second end surface 213 of the first valve core 10. The second connection part includes a spline sleeve disposed on the second gear 36. The spline shaft 14 forms a detachable connection with the spline sleeve.

In an alternative embodiment, the multi-way valve 100 can be used in a coolant circuit of a thermal management system of an electric vehicle, so that the electric vehicle has the advantages of light weight and cost saving. Compared with electric vehicles which needs two driving devices to control a three-way proportional valve and a two-way proportional valve, electric vehicles using the multi-way valve 100 can save 100 yuan on average and reduce 100 g per vehicle.

Examples or embodiments in this specification are described in a progressive manner. Each embodiment is emphatically described in the difference over other embodiments, and the same and similar contents between various embodiments can be referred to each other.

In the description of this specification, references to "one embodiment", "some embodiments", "schematic embodiments", "examples", "specific examples" or "some examples" mean that specific features, structures, materials or characteristics described in combination with the embodiments or examples are included in at least one embodiment or example of the present application. In this specification, the schematic expressions of the above terms do not necessarily refer to the same embodiment or example. Moreover, the specific features, structures, materials or characteristics described may be combined in any one or more embodiments or examples in a suitable manner.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent substitutions to some or all technical features thereof. And these modifications or substitutions do not make the essence of the corresponding technical solutions deviate from the scope of the technical solutions of various embodiments of the present application.

What is claimed is:

1. A multi-way valve, comprising a valve seat, a first valve core, a second valve core, and a driving device; wherein
the driving device is drivingly connected to the first valve core;
the first valve core is provided with a first matching structure, and the second valve core is provided with a second matching structure that matches with the first matching structure, the first matching structure and the second matching structure have a first matching state and a second matching state, and in the first matching state, the first valve core rotates alone, and the second valve core remains stationary, and in the second matching state, the first valve core rotates to drive the second valve core to rotate synchronously;

the valve seat is provided with a plurality of first valve ports corresponding to the first valve core, and the first valve core is provided with a first communication structure, and the first communication structure is configured to make at least two first valve ports communicate with each other when the first valve core rotates to a first predetermined position;

the valve seat is provided with a plurality of second valve ports corresponding to the second valve core, and the second valve core is provided with a second communication structure, and the second communication structure is configured to make at least two second valve ports communicate with each other when the second valve core rotates to a second predetermined position;

wherein the first matching structure comprises a protrusion structure disposed on a first end surface of the first valve core, and the second matching structure comprises a groove structure disposed on a second end surface of the second valve core, the first end surface is opposite to the second end surface, and at least a portion of the protrusion structure is located in the groove structure;

an inner peripheral surface of the groove structure is provided with a first protrusion part, and the first protrusion part comprises a first end surface and a second end surface which are arranged at intervals in a circumferential direction of the inner peripheral surface of the groove structure, and in the first matching state, the protrusion structure is not in contact with the first end surface and the second end surface, and in the second matching state, the protrusion structure abuts against the first end surface or the second end surface;

wherein the inner peripheral surface of the groove structure comprises a first cylindrical surface, and the first protrusion part is disposed on the first cylindrical surface;

the protrusion structure comprises a first cylinder body, and a second protrusion part protruding radially outward from an outer peripheral surface of the first cylinder body; the outer peripheral surface of the first cylinder body is located at a radial inside of the first protrusion part of the first protrusion part, two end surfaces of the second protrusion part in a circumferential direction of the second protrusion part respectively form a first side surface and a second side surface;

an outer peripheral surface of the second protrusion part comprises a second cylindrical surface, and the second cylindrical surface is adapted to the first cylindrical surface.

2. The multi-way valve according to claim 1, wherein the first protrusion part comprises a third cylindrical surface disposed at a radial inside of the first protrusion part, and the outer peripheral surface of the first cylinder body comprises a fourth cylindrical surface, and the third cylindrical surface is adapted to the fourth cylindrical surface.

3. The multi-way valve according to claim 1, wherein the protrusion structure comprises a second cylinder body disposed on the first end surface of the first valve core and connected with the first cylinder body.

4. The multi-way valve according to claim 3, wherein the second cylinder body is a circular cylinder, and the second cylinder body has a same diameter as the second cylindrical surface.

5. The multi-way valve according to claim 1, wherein the first communication structure comprises a first groove disposed on an outer peripheral surface of the first valve core and extending in a circumferential direction of the first valve core;

the second communication structure comprises a second groove arranged on an outer peripheral surface of the second valve core and extending in a circumferential direction of the second valve core.

6. The multi-way valve according to claim 2, wherein the first communication structure comprises a first groove disposed on an outer peripheral surface of the first valve core and extending in a circumferential direction of the first valve core;

the second communication structure comprises a second groove arranged on an outer peripheral surface of the second valve core and extending in a circumferential direction of the second valve core.

7. The multi-way valve according to claim 3, wherein the first communication structure comprises a first groove disposed on an outer peripheral surface of the first valve core and extending in a circumferential direction of the first valve core;

the second communication structure comprises a second groove arranged on an outer peripheral surface of the second valve core and extending in a circumferential direction of the second valve core.

8. The multi-way valve according to claim 4, wherein the first communication structure comprises a first groove disposed on an outer peripheral surface of the first valve core and extending in a circumferential direction of the first valve core;

the second communication structure comprises a second groove arranged on an outer peripheral surface of the second valve core and extending in a circumferential direction of the second valve core.

9. The multi-way valve according to claim 5, wherein the valve seat is provided with three first valve ports, and an angle formed by each of the three first valve ports in a circumferential direction of the valve seat is less than or equal to an angle formed by the first groove; and/or, the valve seat is provided with two second valve ports, and an angle formed by each of the two second valve ports in a circumferential direction of the valve seat is less than or equal to an angle formed by the second groove.

10. The multi-way valve according to claim 9, wherein each of the three first valve ports is connected to the first valve core through a first channel, each of the two second valve ports is connected to the second valve core through a second channel, each of the three first valve ports and each of the two second valve ports are arranged at a same side of the valve seat.

11. The multi-way valve according to claim 1, wherein the driving device comprises a motor and a gear set drivingly connected to the motor, and the gear set is drivingly connected to the first valve core.

* * * * *